US012386820B2

(12) United States Patent
Chernenko et al.

(10) Patent No.: US 12,386,820 B2
(45) Date of Patent: Aug. 12, 2025

(54) SYSTEM AND METHOD PERFORMING TERMINOLOGY DISAMBIGUATION

(71) Applicant: SAP SE, Walldorf (DE)

(72) Inventors: Tetyana Chernenko, Heidelberg (DE); Benjamin Schork, Wilhelmsfeld (DE); Marcus Danei, Plankstadt (DE)

(73) Assignee: SAP SE, Sap (SE)

( * ) Notice: Subject to any disclaimer, the term of this patent is extended or adjusted under 35 U.S.C. 154(b) by 284 days.

(21) Appl. No.: 18/059,237

(22) Filed: Nov. 28, 2022

(65) Prior Publication Data

US 2024/0176778 A1    May 30, 2024

(51) Int. Cl.
*G06F 16/242*    (2019.01)
*G06F 40/242*    (2020.01)
*G06F 40/30*    (2020.01)

(52) U.S. Cl.
CPC .......... *G06F 16/243* (2019.01); *G06F 40/242* (2020.01); *G06F 40/30* (2020.01)

(58) Field of Classification Search
CPC ....... G06F 16/243; G06F 40/242; G06F 40/30
See application file for complete search history.

(56) References Cited

U.S. PATENT DOCUMENTS

| 2010/0153090 A1* | 6/2010 | Chen | G06F 40/30 707/706 |
| 2013/0231919 A1* | 9/2013 | Xiong | G06F 40/30 704/9 |
| 2014/0101606 A1* | 4/2014 | Albrecht | G06F 3/0481 715/803 |
| 2021/0286955 A1* | 9/2021 | Scharnbacher | G06F 9/454 |
| 2021/0342540 A1* | 11/2021 | Firat | G06F 16/353 |
| 2024/0168997 A1* | 5/2024 | Shrivatsa Bhargav | G06F 16/90344 |

* cited by examiner

*Primary Examiner* — Sonia L Gay
(74) *Attorney, Agent, or Firm* — Fountainhead Law Group, PC

(57) ABSTRACT

Term ambiguity is resolved by referencing a terminology database. An input is received comprising the term designated as ambiguous, and a string including the term. The term is posed as a query to the terminology database containing metadata of at least one type. Query results are returned including at least two possible meanings. Sequence (s) are extracted from the query results, each sequence including at least two pieces of metadata of a same type—one for each possible meaning of the ambiguous term. The metadata of each entry of a sequence is compared with the query result and corresponding scores are calculated. The scores are compared to determine a final meaning of the ambiguous term. Simpler embodiments considering one type of metadata (one sequence), may calculate and compare a listing of scores. Complex embodiments considering more than one type of metadata (multiple sequences), may calculate and compare a matrix of scores.

20 Claims, 9 Drawing Sheets

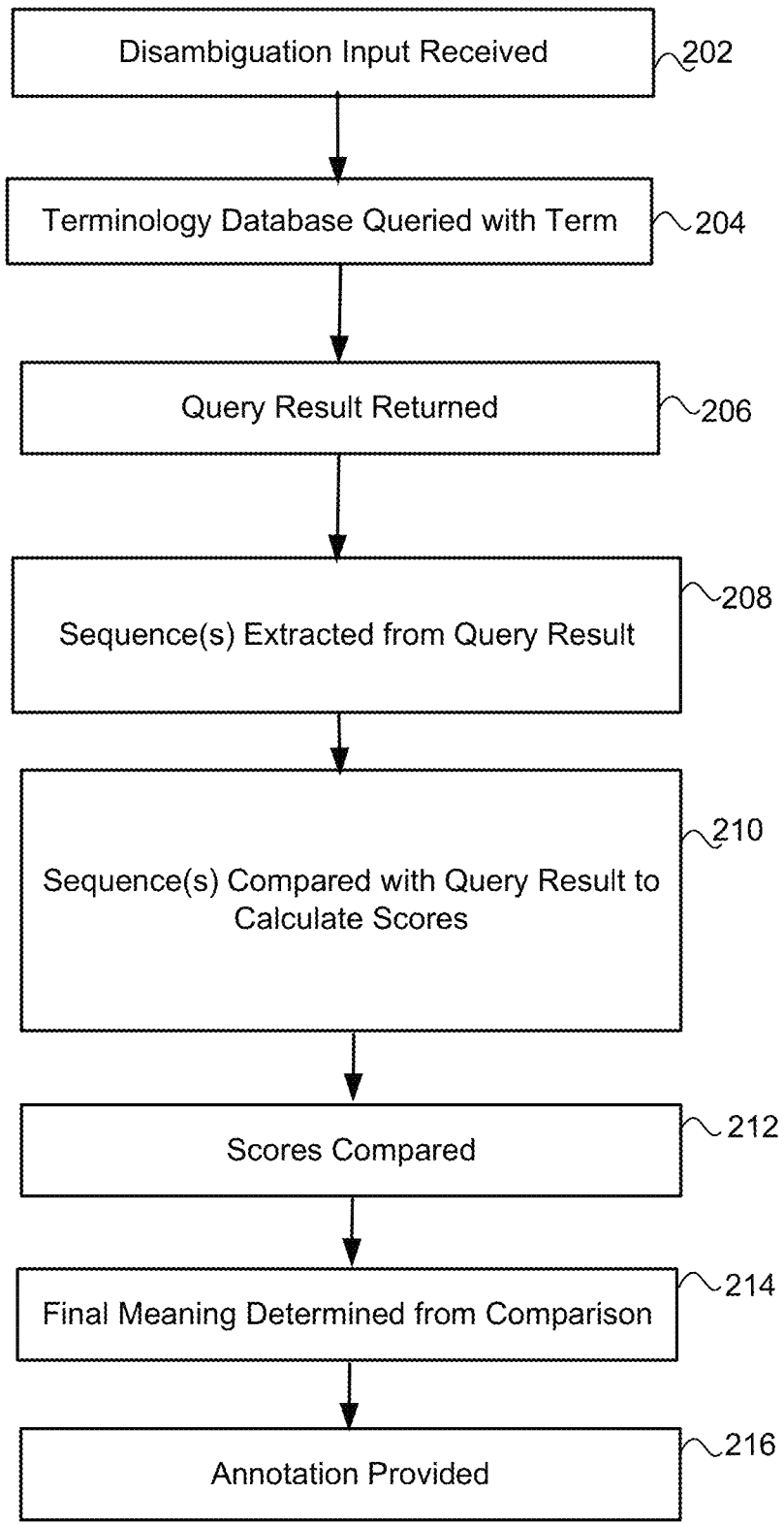

SAPTerm Metadata Type: "definition"

For SAPTerm "Storno"

"activity by the SAP System, corresponding reversal postings. The resetting of the last change made to a transaction, recorded as an If postings are linked to the activity, they are corrected using the"

"">&amp;EXAMPLE&amp; Recalculation of a business transaction. Cancellation Reduction of contract scope the reversed task confirmation. The reversal task confirmation references the reversed task confirmation. A type of task confirmation that reverses an earlier task confirmation. A reversal task confirmation voids stock and financial changes made by"

"reversal confirmation results in an inventory change. A confirmation which cancels (reverses) another confirmation. Posting a"

"Application (BEA) are billed together. items can be changed and rebilled as required. The process whereby several billing documents in a Billing Engine Once the cancellation has taken place, the original billing due list"

"by creating reversal transactions. A counter transaction that voids a prior transaction. For financial audit reasons, transactions are voided rather than deleted"

"A partial or a full cancellation, in a Billing Engine Application (BEA)."

Other examples:

"is calculated. The amount of time extending into the future on which a demand forecast"

"trying to post a supplier invoice containing similar information to a supplier invoice that has already been posted, and that these supplier invoices might be duplicates. An exception meaning that the system has identified that the user is"

FIG. 3

SAPTerm Metadata Type: "context"

For SAPTerm "Storno":

<descrip type="context">Geschaeftsverwaltungsprozess/Buchung </descrip>

<descrip type="context">Fakturierung </descrip>

<descrip type="context">"Ab Release 4.0A werden Stornos von Wareneingaengen bei der Berechnung der Noten fuer die Kriterien Termintreue, Mengentreue, Einhaltung des Bestaetigungsdatums und Versandvorschrift beruecksichtigt. Die Stornos beziehen sich auf eine Bestellposition." (RELNMM_PUR_40A_LIBE). "Das System beruecksichtigt nur Wareneingaenge zu Bestellungen und Lieferplaenen in das Lager und die Freigabe von Wareneingangssperrbestaenden in das Lager sowie die zugehoerigen Stornierungen." (RELNMM_PUR_40A_LIBE). </descrip>

<descrip type="context">See German source info. ————————————— "Reversal": "Accounting entry that offsets a previous entry" ("Dictionary of Business Terms", Barron's Business Guides, USA, 1987, - definition 2). </descrip>

<descrip type="context">Transaktion MR08/R/3-Hinweis 0082506 1998: (Storno/Stornierung einer Rechnung). "Sie stornieren Positionen einer Bestellung, indem Sie sie loeschen. Zum Beispiel dann, wenn Sie in einer Bestellposition 100 Stueck bestellt haben, aber nach Lieferung und Bezahlung von 25 Stueck die Restmenge nicht mehr haben moechten." (Winhelp-Doku MMPUR zu 4.0, Kap. ME06D.DOC, Abschn. "Bestellung stornieren".) "Belegstornierung": "in Zusammenhang mit MBST Belegstornierung auf Material mit Verfallsdatum, erhalte ich nachfolgenden Fehler: NA M7001 Tabelleneintrag fehlt W5 ST H in Tabelle 063." (Kundenproblemmeldung 0120050409 0000413979 2003; "mbst".) (Transaktion MBST = "Materialbeleg stornieren") </descrip>

Other examples:

<descrip type="context">DTEL STDBD_VK </descrip>

<descrip type="context">RMS 2.0 </descrip>

FIG. 4

Terminology Disambiguation

Source language: DE
Target language: EN

Source text ⊞ Upload dataset

Ein Storno oder der Wunsch nach Umbuchung muss per Mail, per SMS oder eingeschrieben an unsere Adresse erfolgen.

Term: Storno

Inline annotation type*
- ○ term translation
- ○ link
- ○ placeholder for semantical meaning
- ○ (custom options)

*Options for "inline abbreviation type" can be easily customized in implementation according to the planned use cases, terminology database structure and internal agreements. E.g., specific formats or tags are possible as abbreviation type. For SAP, "link" means a link to the correct semantical meaning of the term in SAPTerm tool, "placeholder" means predefined annotations for different semantical meanings of the term in SAPTerm tool (unique keys of SAPTerm entries or any other internal agreements to clearly identify the entry in SAPTerm tool).

Terminology Disambiguation

Source language: DE
Target language: EN

Source text ⊞ Upload dataset

Ein Storno oder der Wunsch nach Umbuchung muss per Mail, per SMS oder eingeschrieben an unsere Adresse erfolgen.

Term: Storno

Inline annotation type
- ☑ term translation
- ○ link
- ○ placeholder for semantical meaning
- ○ (custom options)

Annotated text

Ein Storno <cancellation> oder der Wunsch nach Umbuchung muss per Mail, per SMS oder eingeschrieben an unsere Adresse erfolgen.

Link

[link to the correct SAPTerm entry for the term "Storno"/ other custom database]

[ Log Details ]

FIG. 7

Terminology Disambiguation

Source language: DE
Target language: EN

Source text [+ Upload dataset]:
Ein Storno oder der Wunsch nach Umbuchung muss per Mail, per SMS oder eingeschrieben an unsere Adresse erfolgen.

Term: Storno

Inline annotation type:
- ☒ term translation
- ☒ link
- ○ placeholder for semantical meaning
- ○ (custom options)

Annotated text:
Ein Storno
<cancellation | (link to SAPTerm entry/ other custom database)>
oder der Wunsch
nach Umbuchung muss per Mail, per SMS oder eingeschrieben an unsere Adresse erfolgen.

Link: (link to the correct SAPTerm entry for the term "Storno"/ other custom database)

[Log Details]

FIG. 8

Terminology Disambiguation

Source language: DE
Target language: EN

Source text [+ Upload dataset]:
Ein Storno oder der Wunsch nach Umbuchung muss per Mail, per SMS oder eingeschrieben an unsere Adresse erfolgen.

Term: Storno

Inline annotation type:
- ☒ term translation
- ○ link
- ☒ placeholder for semantical meaning
- ○ (custom options)

Annotated text:
Ein Storno
<cancellation | SAPTerm entry unique id*>
oder der Wunsch
nach Umbuchung muss per Mail, per SMS oder eingeschrieben an unsere Adresse erfolgen.

*or any other predefined annotation clarifying the semantical meaning

Link: (link to the correct SAPTerm entry for the term "Storno"/ other custom database)

[Log Details]

Terminology Disambiguation

Source language
[ DE ]

Source text  [+] Upload dataset

[ (dataset uploaded) ]

Annotated text

[ Download annotated dataset ]

Target language
[ EN ]

Term
[ Storno ]

Inline annotation type
☒ term translation
○ link
☒ placeholder for semantical meaning
○ (custom options)

Link
[ (link to the correct SAPTerm entry for the term "Storno"/ other custom database) ]

[ Log Details ]

Data Processing GUI

Source language
[ DE ]

[+] Upload dataset

Source text

[                    ]

Data processing pipeline
○ tokenization
○ POS-tagging
○ stop-words removal
○ NER
○ lemmatization
○ stemming
○ punctuation removal
○ terminology disambiguation
  ⚙ customize

*(simplified visualization)*

SYSTEM AND METHOD PERFORMING TERMINOLOGY DISAMBIGUATION

BACKGROUND

Unless otherwise indicated herein, the approaches described in this section are not prior art to the claims in this application and are not admitted to be prior art by inclusion in this section.

Natural Language Processing (NLP) is a valuable technique where raw language inputs (rather than specific commands) are received as input. NLP finds possible application in a variety of domains, including but not limited to: Machine Translation, Retrieval, Knowledge Extraction, Text Summarization, Knowledge Graphs and Ontologies, Semantic Domains Reduction, Voice Recognition, Language Generation, Speech-to-speech, and others.

The quality of results returned by NLP systems can depend upon accurate identification of terms in domain-specific texts, and upon their disambiguation. Accordingly, data preparation may be usefully performed in NLP-based approaches.

SUMMARY

Embodiments resolve ambiguity of terminology that is the subject of Natural Language Processing (NLP). An input is received comprising a term designated as ambiguous, and a string including that term. The term is used to pose a query to a terminology database containing metadata of at least one type. Query results are returned including at least two possible meanings. A sequence is extracted from the query results, with each sequence including at least two pieces of metadata—one for each possible meaning of the ambiguous term. The metadata of each entry of the sequence is compared with the query result and corresponding scores are calculated. The scores are compared to determine the final meaning of the ambiguous term.

Simple embodiments considering only one (1) type of terminology database metadata, may calculate and compare a listing of scores. However, more complex embodiments considering multiple types of terminology database metadata, may calculate and compare a matrix of scores.

Terminology disambiguation may be implemented in a variety of ways. For example, disambiguation capability could be offered as a separate, external service that is called by an existing software application. Alternatively disambiguation could optionally be implemented as an internal function of, or a library called by, an existing software application.

The following detailed description and accompanying drawings provide a better understanding of the nature and advantages of various embodiments.

BRIEF DESCRIPTION OF THE DRAWINGS

FIG. 2 shows a simplified flow diagram of a method according to an embodiment.

FIG. 3 shows results for one type of metadata according to an example.

FIG. 4 shows results for another type of metadata according to the example.

FIGS. 5-10 show sample interface screens according to examples.

DETAILED DESCRIPTION

Described herein are methods and apparatuses that implement term disambiguation. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
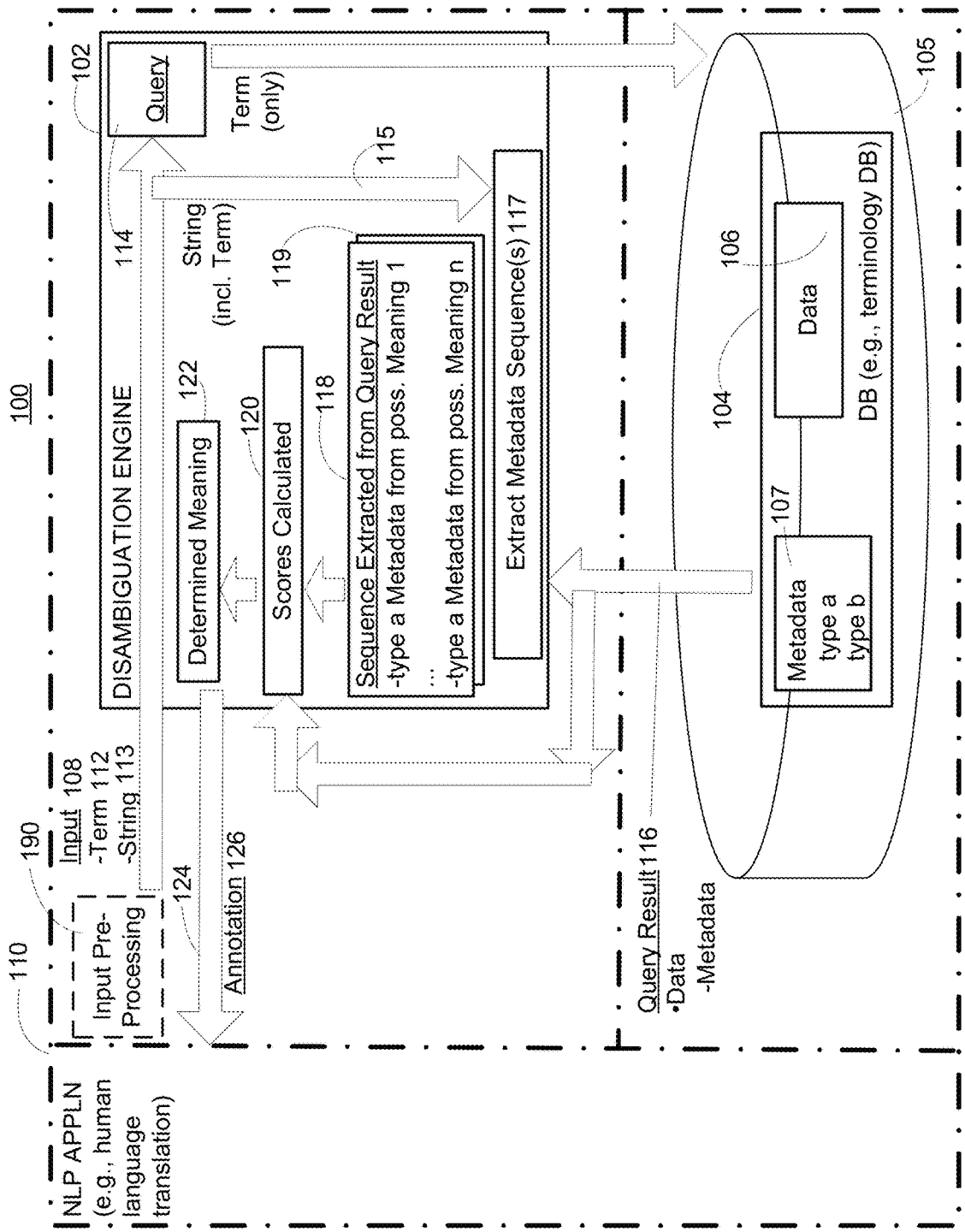
FIG. 1 shows a simplified diagram of a system according to an embodiment.

FIG. 1 shows a simplified view of an example system that is configured to implement terminology disambiguation according to an embodiment. Specifically, system 100 comprises a disambiguation engine 102 in communication with a database 104 (e.g., terminology database) that is present within non-transitory computer readable storage medium 105. The database includes data 106 and corresponding metadata 107, including metadata of different types (e.g., type a: type b).

The disambiguation engine is configured to receive input 108 from an application 110, e.g., a Natural Language Processing data preparation application. FIG. 1 depicts with broken lines, the relationship between the application and disambiguation engine/database. This is because in certain embodiments, the disambiguation engine and/or database may be internal to the application. Alternatively however, the disambiguation engine and/or database may be external to the application and implemented as a service.

The input received by the disambiguation engine, comprises a term 112 that is designated as ambiguous. The input also comprises a string 113 including the term.

The disambiguation engine receives the input. Based upon the term, the disambiguation engine posits a search query 114 to the database. The query includes the term, but not the entire input string, as a parameter.

In response to the query, the disambiguation engine receives a query result 116. The query result includes both relevant data and corresponding metadata (of types a and b).

The disambiguation engine then references 115 the input to extract 117 a sequence 118 from the query result. The sequence includes entries of metadata of a same specific type (e.g., of type a, or of type b, but not both) corresponding to different data that is returned as relevant by the query result.

FIG. 1 further shows a second sequence 119 as also being extracted. Such a second sequence would comprise entries of a different metadata type (e.g., of type b). However, it is emphasized that extraction of multiple sequences (i.e., of different metadata types) is not required by all embodiments.

Extracted sequence(s) of metadata are not limited to any particular structure. A metadata sequence can be structured as:
an ordered list;
dictionary; or
any other suitable structure (based, e.g., on development language and/or implementation).

Next, the entries of the sequence (corresponding to different returned data) are compared with the query result, in order to calculate scores 120. Such scoring may involve the calculation of an edit distance, for example.

A simple embodiment involving only one metadata type (and hence only a single sequence), the scores may be in the form of a list. However, more complex embodiments may consider multiple metadata types (each extracted into a separate sequence). There, the scores may be in the form of a matrix. According to some embodiments, scores may be weighted.

Next, the disambiguation compares the scores to determine a final meaning 122 (e.g., to resolve ambiguity of the designated term of the input). That is, the data associated with the highest scoring metadata, is determined to be the final meaning.

The disambiguation engine returns 124 the final meaning to the application. This final meaning may be in the form of an annotation 126 of the original input (e.g., located proximate to the ambiguous term in the string).

It is noted that FIG. 1 shows the input to the disambiguation engine in the form of a string comprising a term marked as being ambiguous. In certain embodiments (such as the particular Example described below) such upstream marking of a term as ambiguous can be the result of manual matching effort (e.g., having a human explicitly mark an ambiguous term in a given text).

Alternatively, however, marking a term as ambiguous (and hence subject to disambiguation) could be performed in an automated manner. In particular, certain embodiments could check tokens of the input for ambiguity. That is, dictionary forms of a token in the input string would be sent as a query to the terminology database for checking.

If the corresponding query result returns multiple entries for a particular token, more than one semantical meaning for that token exists (ambiguity is present). In this manner, a term could be automatically matched and marked as ambiguous in the input.

For such automatic detection of ambiguity, an additional step of input pre-processing 190 may be employed. Such pre-processing may include one or more of
- tokenization;
- punctuation removal;
- stop-words removal; and
- setting a token to its dictionary form.

FIG. 2 is a flow diagram of a method 200 according to an embodiment. At 202, an input is received comprising a string and an indication of an ambiguous term in the string.

At 204, a database is queried with the ambiguous term. At 206, a query result comprising data and metadata is returned.

At 208, the input is referenced to extract from the query result, a sequence comprising entries of a specific metadata type. At 210, the query result is referenced to calculate scores for entries of the sequence.

At 212, the scores are compared. At 214, based upon the comparison a final meaning is determined.

At 216, the final meaning is communicated (e.g., as an annotation of the original input received).

Further details regarding term disambiguation according to various embodiments, are now provided in connection with the following example. Higher level features of this particular example can be summarized as follows.
1) The application providing the input, is the SAP Translation Hub (STH) human language translation application, available from SAP SE, of Walldorf, Germany.
2) The input comprises a (German language) string having the term ("storno"), already matched and marked as ambiguous as a result of manual effort.
3) Disambiguation is implemented in conjunction with the SAPTerm terminology database, available from SAP SE of Walldorf, Germany.
4) Two separate metadata types ("definition"; "context") of SAPTerm are considered in determining the final meaning. The "definition" metadata is in the English language. The "context" metadata may be in both the English and German languages.
5) Scoring to resolve ambiguity involves a matrix—owing to utilization of the two (2) DISTINCT ("definition"; "context") metadata types.

EXAMPLE

Embodiments offer the disambiguation of SAP-specific terminology in translation data, which allows reduction in a number of semantically unclear homonyms in recognized terms. This particular example derives hidden information from SAPTerm meta-data and explores it for the clarification of the meaning of the found-in-translation data terms and allows to map such homonymous terms to specific SAPTerm entries.

Terminology matching can be divided into two main phases:
1. Terminology matching/recognition
2. Disambiguation of the matched results Possible solutions for the first phase may be specific for language and use-case, and depend on requirements and risk assessment. Accordingly, in this example we concentrate on the second phase and aims to disambiguate already-recognized terms.

Here, it is assumed that matched terminology does not contain false positives. This could be achieved, e.g., using exact match and not considering the missed inflected terms, or involving human verification into the loop.

This example is dependent on the quantity of the available context in translations and thus is more suitable for non-UI translation data. This example relies upon the quality of the SAPTerm database, but may employ a human in a loop for the verification of results while improving outcomes and decreasing human effort consumed for the verification.

This particular example explores the potential of the SAPTerm tool, rendering the solution SAP-specific. However, usage of industry-specific terminology databases is a common practice outside of SAP. Also, enriching a non-SAP terminology database with several SAPTerm-native features, can result in general applicability and reproducibility.

Every term in SAPTerm is represented by a set of metadata. As is discussed further below; the specific types of SAPTerm metadata fields used in this example are "definition" and "context".

In addition, SAP translation data also possesses translation-relevant metadata. Such translation data may be provided by the SAP Translation Hub (STH) available from SAP SE of Walldorf Germany.

This specific exemplary embodiment derives information from specific SAPTerm metadata fields for homonymous terms. That derived information is compared with translation context or translation metadata of the translation where the term with unclear meaning was matched. A disambiguation decision is reached based upon the results of this comparison.

This exemplary embodiment uses different types of contexts from SAPTerm for homonymous terms, processed in a specific way. By following SAP-specific processing of the SAPTerm fields, deriving hidden knowledge from them, and finding the connections, one is able to apply context-focused approaches for calculating the semantical similarity of the derived knowledge, e.g.:
dictionary- and knowledge-based,
supervised,
semi-supervised and unsupervised,
cross-lingual, and
others,
upon the processed context.

Given as input is a translation text (string), and a matched term in this text. That matched term refers to more than one SAPTerm entry (ambiguous term). Alternatively, as shown in FIG. 9, a whole dataset with several matched ambiguous terms can be provided as the input.

In an optional Step 1, a bi- or multilingual approach is used for disambiguation as a preparation step. Here, English is used as a second language.

In Step 2, for every homonymous SAPTerm entry for the matched term, the "definition" and "context" metadata fields are processed. Metadata fields and the query string are processed (including steps of pre-processing and field-specific information extraction) and post-processed (entries of the results of the processing steps of the "definition" metadata field and the "context" metadata field are separately compared to the results of the processing of the query string, and a matrix of scores is created).

The "definition" SAPTerm metadata field contains an unstructured free-style description of the meaning of a term. FIG. 3 shows a list of Definition fields for the German Language term "Storno".

It is noted that the content of FIG. 3 may exhibit certain issues:
Missing parts: definition is missing: a part of the description is cut off;
Semantical issues: internal comments instead of definition;
Grammar issues: spelling errors or typos, wrong case, wrong number of whitespaces, special characters (&);
Punctuation issues: errors or typos, "." Instead of ",", no punctuation between sentences;
Style issues: informal style.

These issues may make it more challenging to process or extract information from the field, using NLP methods. However, even such descriptions often contain context information and help to clarify the meaning of the term.

Improving the quality of the descriptions in SAPTerm to a canonical or at least formal style, can help to solve the task in a better way. This may be done through human-based improvement of the existing fields and creating quality guides for translators creating the fields in SAPTerm.

A sample workflow is now described. If the matched SAPTerm is homonymous, for every SAPTerm entry for this term run the following.
Take English/German translation of the SAPTerm entry.
Extract the text from "definition" field.
Tokenize, identify punctuation marks in text.
Identify, if token "example" (or its variations, like "example", "Example", "e.g.", "eg", "EG", ", i.e.", "ie") occurs in text. If yes, save the whole text after the found word "example" (without the word itself and the "," or ":" punctuation marks after it if it is there) in a separate list "Definition, priority 1: context of usage".
Save the remaining text (or the whole text, if priority 1: context of usage" list was not created) in a separate list "Definition, priority 2: definition context".

For both lists, run pre-processing steps (deletion of punctuation, stop-words removal, low-casing for specific languages, lemmatizing).
Take the translation text, where the SAPTerm was matched.
Run same pre-processing steps over it, as above (deletion of punctuation, stop-words removal, low-casing for specific languages, lemmatizing). Save result as a "translation context of usage" list.

Afterward, context-based word sense technique(s) for calculating the semantical similarity can be applied for the comparison of the lists from the "definition" field and from the translation, while the context of usage of the term (if available) for "definition" field has more weight than context of definition:
If "Definition, priority 1: context of usage" list was created, compare it with the list "translation context of usage" using the min Edit Distance or other context-based technique(s) calculating the semantical similarity of the strings. The resulting score is the "Definition, priority 1: similarity of the context of usage score".
Compare the list "translation context of usage" with the list "Definition, priority 2: definition context" using the min Edit Distance or other context-based technique(s) calculating the semantical similarity of the strings. The resulting score is the "Definition, priority 2: similarity of the definition context score".

The corresponding output comprises "y" pairs of scores as follows, where "y" is the number of found SAPTerm entries with different meanings for the given ambiguous term:
SAPTerm 1: context of usage score 1, definition context score 1
SAPTerm 2: context of usage score 2, definition context score 2
SAPTerm y: context of usage score y, definition context score y FIG. 4 shows a list of context fields for the German Language term "Storno". This field "context" occurs more often than the field "definition".

The SAPTerm field "context" contains ABAP-specific context for the term, instructions, for what UI, table, transaction, etc. the term must be used. Sometimes, the SAPTerm field "context" contains examples of usage of the term as well.

A sample workflow is now described. If the matched SAPTerm is homonymous, for every SAPTerm entry for this term run the following:
Take English/German translation of the SAPTerm.
Extract the text from "context" field.
Identify, if "example" (or its variations, like "example", "Example", "e.g.", "eg", "EG", ",i.e.", "ie") occurs in text. If yes, save the whole text after the found word "example" (without the word itself and the "," or ":" punctuation marks after it, if it is there) in a separate list "Context field, priority 2: context of usage".
Run pre-processing steps (deletion of punctuation, stop-words removal, low-casing for specific languages, lemmatizing) over the "Context field, priority 2: context of usage".
Take the translation text, where the SAPTerm was matched.
Save meta-information "package name", referring to translation text.
Run same pre-processing steps over it, as above (deletion of punctuation, stop-words removal, low-casing for specific languages, lemmatizing). Save result as a "translation context of usage" list.

In the remaining text, identify the ABAP-specific context for the term (UI, table names, transactions, package names, etc.). For that, use a set of regular expressions, created on basis of the information from TADIR system (SAP table, storing the information about the original system for ABAP development objects at SAP) and available naming conventions to extract ABAP-specific context (for example, word(s) in upper case containing "_", word(s) in upper case followed by x(v).z(j) number, etc.).

Save the extracted ABAP-context in a separate list "Context field, priority 1: ABAP context" (every RE match as a separate entity).

Check every entry from the "Context field, priority 1: ABAP context" list in the TADIR system to find the connection to the ABAP package name.

Directly compare the package name, referring to translation text, with package names, derived from the "context" fields. If matches found, store the SAPTerm entry of the ambiguous term, where the match was found, and ignore the next step.

If no package name matches were found and "Context field, priority 2: context of usage" was created, apply for comparison same context-based techniques for calculating the semantical similarity, as used for comparison in the "definition" field. For example, compare it with the list "translation context of usage" using the min Edit Distance or other context-based techniques calculating semantical similarity of the strings. The resulting score is the "Context field, priority 2: similarity of the context of usage score".

The corresponding output is as follows, comprising "y" pairs of scores, where "y" is the number of found SAPTerm entries with different meanings for the given ambiguous term:

SAPTerm 1: (matched SAPTerm entry), context of usage score 1
SAPTerm 2: context of usage score 2
SAPTerm y: context of usage score y.

In Step 3, the outputs from Step 2 are compared in the following manner.

If during the step 2, for any of the SAPTerm entries the extracted from its "context" field information can be directly matched with the translation metadata of the query string, the corresponding SAPTerm is the entry with the correct meaning for the matched in the translation text term. the matched SAPTerm entry is available, Otherwise, multiply each context of usage score with weight x (tuned parameter, based on a small experimental setup).

| Ambiguous SAPTerm entry | "definition" field scores | "context" field scores |
|---|---|---|
| SAPTerm 1: | context of usage score 1 * x, definition context score 1 | (matched SAPTerm entry), context of usage score 1 * x |
| SAPTerm 2: | context of usage score 2 * x, definition context score 2 | context of usage score 2 * x |
| SAPTerm y: | context of usage score y * x, definition context score y | context of usage score y * x |

For each term, summarize all available scores.
Disambiguation result: Select the SAPTerm entry with the highest resulting score as the most suitable meaning for the matched term.

Neural Machine Translation (NMT) is one example of an application for Natural Language Processing. As part of the task of incorporating internal or external terminology into Neural Machine Translation in a data processing pipeline, a user may annotate the terminology in the source language data with dictionary forms of correct target language terms.

Consider, for example, the following natural language phrase in the German language: "Ein Storno oder der Wunsch auf Umbuchung muss per Mail, per SMS oder eingeschrieben an unsere Adresse erfolgen."

Here, the German language term: "Storno" may have an ambiguous meaning. That is, in the SAPTerm tool (using a SAP-specific terminology database), "Storno" has multiple entries with different semantical meanings.

Such different semantic meanings can result in several possible translations to other languages. For example, "Storno" can legitimately be translated into English as:
"reversal",
"cancel",
"cancellation",
"reverse",
"cancel attendance", or
others.

Each of these possible translations is potentially valid for a particular context. Moreover, the fact that the term "Storno" may belong to a particular technical or scientific domain, can render the disambiguation process even more challenging.

Thus, according to this exemplary embodiment, a user may:
enter the string that includes the ambiguous term "Storno",
mark the specific term "Storno" as ambiguous, and
specify English as a target language.
FIG. 5 shows a sample input to such a disambiguation approach implemented as a service.

In response, the user receives the following correct dictionary form of the ambiguous term in the target language, with the annotation displayed a pre-defined format being marked in bold type in the example below.

"Ein Storno <cancellation> oder der Wunsch auf Umbuchung muss per Mail, per SMS oder eingeschrieben an unsere Adresse erfolgen."

The corresponding output screen for such a disambiguation service is shown in FIG. 6.

Other types of annotation can possibly be returned as output. The desired type(s) of annotation(s) can be adjusted in advance. For example, a user can choose the type of annotation from a drop-down list.

Possible types of annotations can include but are not limited to:
target language term only,
target term and a link to the correct entry in the terminology database,
a specific placeholder instead of a link (different placeholders refer to different terminology entries in the terminology database/different semantical meanings).

Thus according to some embodiments the user has the option to select an annotation in the form of a link to the correct entry in the database. This is shown in FIG. 7.

In some embodiments the user has the option to select an annotation in the form of placeholder(s) for different semantical meanings. This is shown in FIG. 8.

The user also has access to the link to the correct entry in the SAPTerm database. From that link, the description, metadata, translations of the term to other languages, can be checked and verified.

Embodiments also make available Log information of the disambiguation process. Having access to such log information can be beneficial where a user seeks to determine possible errors arising during the disambiguation process.

Optionally, a dataset with marked ambiguous terms can be uploaded instead of a string. (This is shown in FIG. 9.)

Terms in the dataset can be annotated manually or automatically. Automatic annotation can be done using exact or fuzzy match or more advanced terminology recognition techniques suitable for terms recognition, with terms of the company-specific terminology database.

After processing, the dataset can be downloaded. The processed dataset can include term annotations and/or links to the terminology dataset/glossary as annotations.

While the above has depicted and described disambiguation implemented as a service, this is not required. According to certain embodiments, term disambiguation can be implemented as a feature in a data preparation platform or service.

Such data preparation services or platforms may be present overlying data processing libraries or APIs. Examples of such libraries or APIs can include but are not limited to:
  NLTK,
  Gensim,
  SpaCy,
  Apache OpenNLP,
  Google Cloud Natural Language API,
  brat,
  Standford CoreNLP,
  others.

An example of a data processing service with Graphical User Interface (GUI) is TagEditor as a wrapper for Python SpaCy library.

Such platforms or services may be used in industry by entities which provide NLP-based productive applications, and regularly update them with new data. Such platforms/services may already have pre-defined workflow for data processing.

For example, Neural Machine Translation (NMT) services retrain their neural networks on new external or internal datasets, or retrain models on customer data to provide NMT for customers. Such applications can use data processing platforms or services over the libraries or APIs to afford a stable workflow of the already pre-defined data processing steps.

Another example of services which can use data processing platforms or services, are Data Mining services. These receive new internal or customer data and process it in a specific manner to perform data analysis. Such processing could be accomplished using data processing platforms or services.

Such data processing platforms or services can be accessed by users lacking deep programming knowledge to perform experiments or research activities. Other users can be research organizations which generalize the data processing workflow for the participants of various NLP research tasks.

Data preparation includes various operations on data, including but not limited to:
  tokenizing,
  stemming,
  classification,
  POS-tagging,
  annotation,
  punctuation and stop-words removal,
  data cleaning,
  named entity recognition,
  terminology disambiguation,
  others.

FIG. 10 shows an example of a user interface screen.

According to some embodiments, term disambiguation could be implemented as a separate library or an API. Such approaches offer flexibility, as data preparation may be a flow of changing processing steps aimed at improving the quality of the results. Using terminology, a disambiguation library or API in combination with (data processing) libraries or APIs provides the user with desired freedom to set up new data processing pipelines for NLP-related industry or research use cases.

It is noted that disambiguation according to specific embodiments may be implemented as a feature in an existing tool. One such existing tool could be the SAP Translation Hub (STH).

Embodiments could be implemented to disambiguate terms in a customer's Multilingual Text Repository (MLTR). In particular, STH allows developers, partners, and customers to create and manage multilingual applications by identifying and reusing existing text strings in a source language and corresponding translations. This allows reuse of existing translations, saving costs for localization and improving integration with existing SAP products.

Another possible example of implementing TD as a feature in an existing application, is in connection with the ABAP Cloud Editor available from SAP SE of Walldorf, Germany. ABAP Cloud Editor performs ABAP short texts translation for SAP internal language production and usage by SAP customers and partners. ABAP Cloud Editor provides useful meta information during translation and allows searching for existing translations and terminology.

After entering a source text into a source text field, a translator can enter an ambiguous term in a new specified field nearby and as output get a correct translation of the disambiguated term to a target language/other type of annotation (chosen before). Optionally, the UI could afford a link to semantically correct for the given context entry in SAP-Term. The translator may also receive access to logging information of the disambiguation process in order to be able to find possible errors.

Returning now to FIG. 1, there the particular embodiment is depicted with the disambiguation engine as being located outside of the database. However, this is not required.

Rather, alternative embodiments could leverage the processing power of an in-memory database engine (e.g., the in-memory database engine of the HANA in-memory database available from SAP SE), in order to perform one or more various functions as described above.

Figure 11:
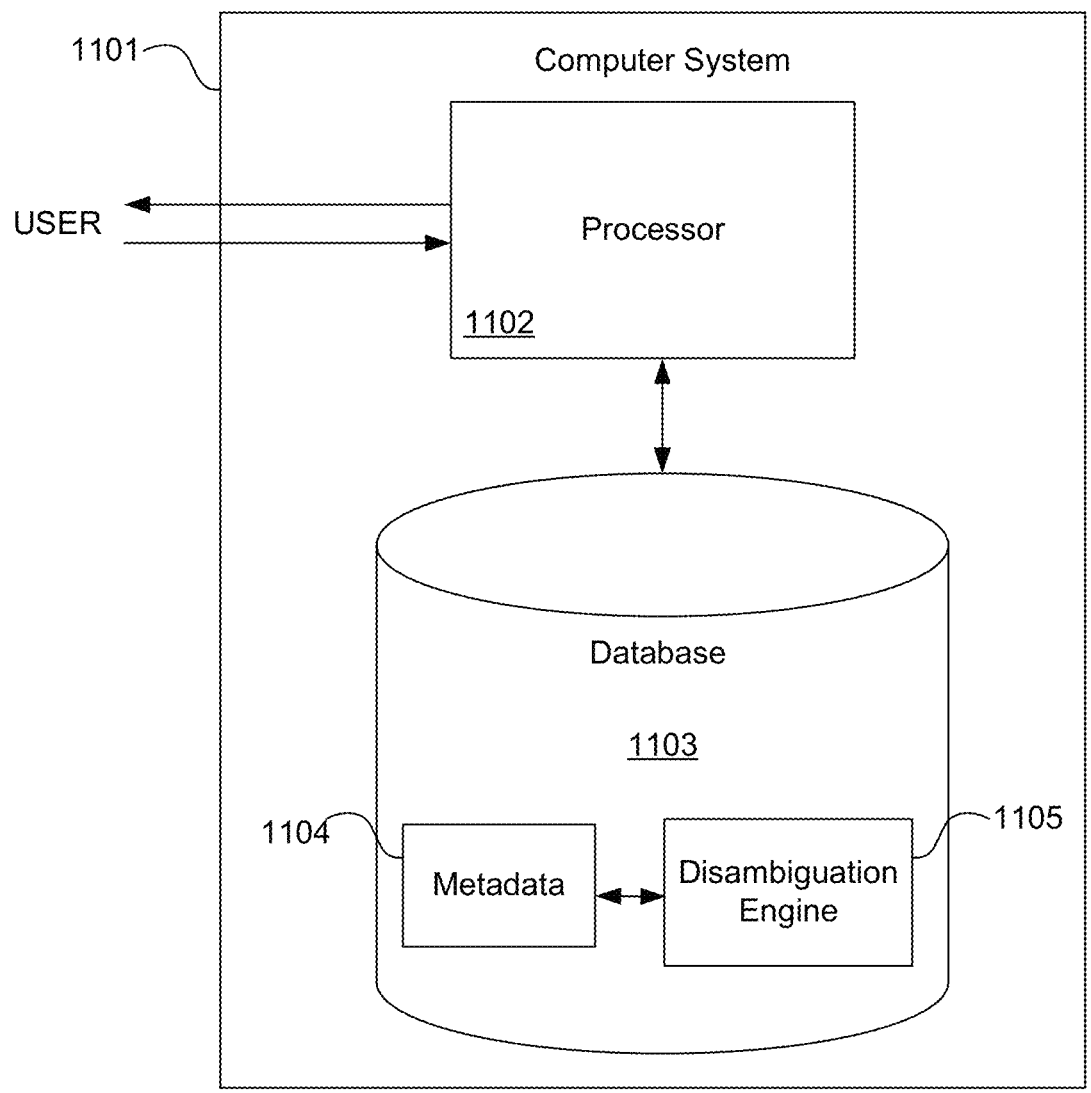
FIG. 11 illustrates hardware of a special purpose computing machine configured to implement terminology disambiguation according to an embodiment.

Thus FIG. 11 illustrates hardware of a special purpose computing machine configured to perform term disambiguation according to an embodiment. In particular, computer system 1101 comprises a processor 1102 that is in electronic communication with a non-transitory computer-readable storage medium comprising a database 1103. This computer-readable storage medium has stored thereon code 1105 corresponding to a disambiguation engine. Code 1104 corresponds to metadata. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:

1. A method comprising:
  receiving an input comprising,
    a string, and
    an indication of an ambiguous term in the string;
  querying a terminology database of a non-transitory computer readable storage medium with the ambiguous term;
  in response to the query, receiving a query result from the terminology database;
  referencing the input to extract from the query result, a first sequence comprising,
  first metadata of a first type corresponding to a data of first possible meaning,
  second metadata of the first type corresponding to a data of a second possible meaning;
  calculating a first score of the first metadata;
  calculating a second score of the second metadata;
  comparing the first score to the second score to determine the data of the first possible meaning to be a final meaning; and
communicating the final meaning to a recipient.

Example 2. The computer implemented system and method of Example 1 wherein: the input is received from the recipient;
  the recipient comprises a software application; and
  the final meaning is communicated back to the recipient as a service external to the software application.

Example 3. The computer implemented system and method of Examples 1 or 2 wherein:
  the input is received from the recipient;
  the recipient comprises a software application; and
  the final meaning is communicated internal to the recipient.

Example 4. The computer implemented system and method of Examples 1, 2, or 3 wherein the indication is a result of input pre-processing that references the terminology database.

Example 5. The computer implemented system and method of Examples 1, 2, 3, or 4 wherein:
  the input is received from the recipient;
  the recipient comprises a software application; and
  the final meaning is communicated internal to the recipient.

Example 6. The computer implemented system and method of Example 5 implemented as a library called by the software application.

Example 7. The computer implemented system and method of Examples 1, 2, 3, 4, 5, or 6 wherein the first score and the second score are in a list.

Example 8. The computer implemented system and method of Examples 1, 2, 3, 4, 5, or 6 further comprising:
  referencing the input to extract from the query result, a second sequence comprising third metadata of a second type and fourth metadata of the second type;
  calculating a third score of the third metadata; and
  calculating a fourth score of the fourth metadata,
  wherein determining the final meaning comprises comparing the third score to the second score.

Example 9. The computer implemented system and method of Example 8 wherein the first score, the second score, the third score, and the fourth score are in a matrix.

Example 10. The computer implemented system and method of Examples 1, 2, 3, 4, 5, 6, 7, 8, or 9 wherein:
  the recipient comprises a human language translation application;
  the input is received from the recipient in a first human language; and
  the final meaning is communicated as an annotation in a second human language.

Figure 12:
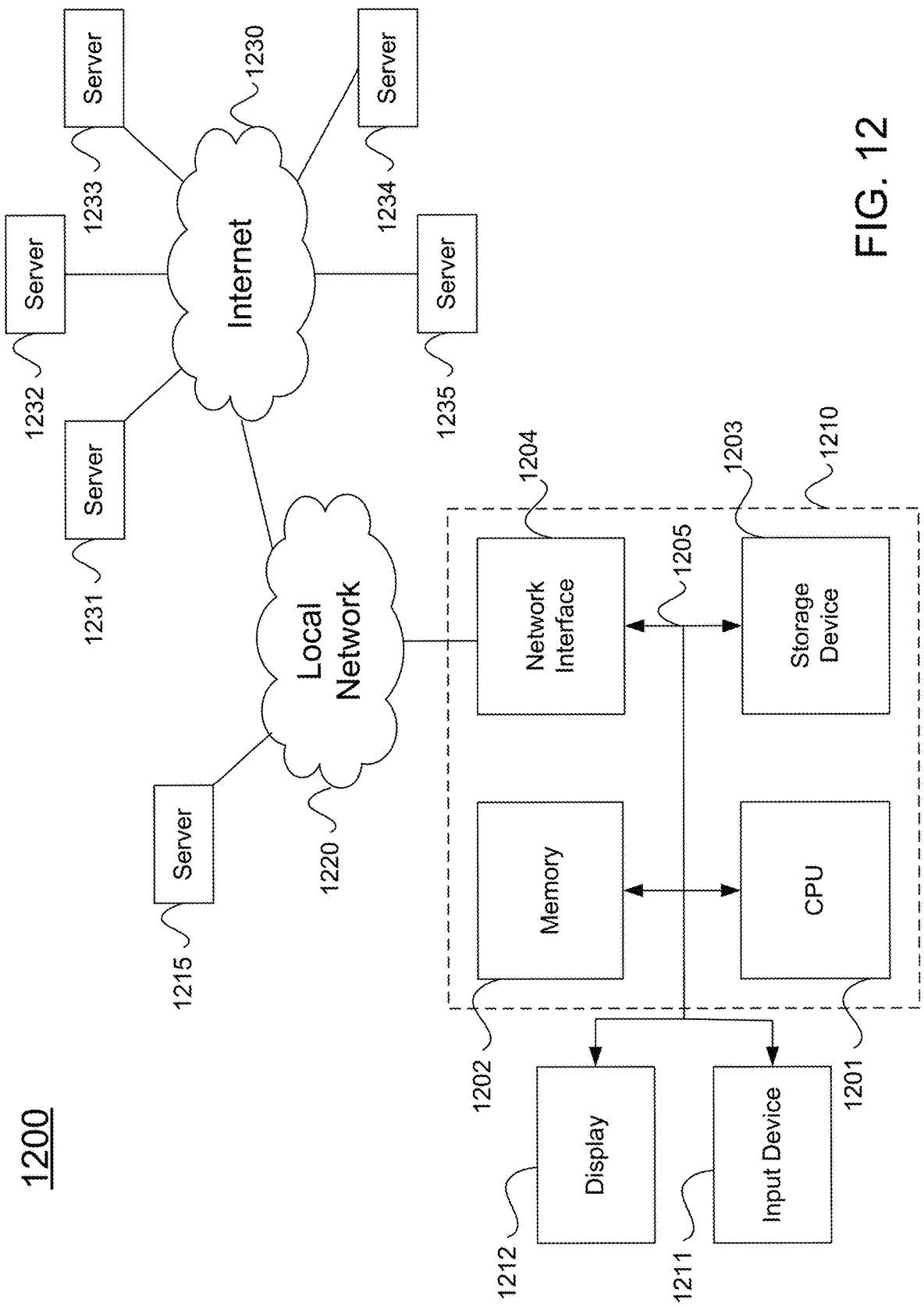
FIG. 12 illustrates an example computer system.

An example computer system 1200 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a Light Emitting Diode (LED) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving an input comprising,
   a string, and
   an indication of an ambiguous term in the string;
   querying a terminology database of a non-transitory computer readable storage medium with the ambiguous term;
   in response to the query, receiving a query result from the terminology database;
   referencing the input to extract from the query result, a first sequence comprising,
   first metadata of a first type corresponding to a data of first possible meaning,
   second metadata of the first type corresponding to a data of a second possible meaning;
   referencing the input to extract from the query result, a second sequence comprising third metadata of a second type and fourth metadata of the second type;
   calculating a first score of the first metadata;
   calculating a second score of the second metadata;
   comparing at least the first score to the second score to determine the data of the first possible meaning to be a final meaning; and
   communicating the final meaning to a recipient.

2. A method as in claim 1 wherein the first score and the second score are in a list.

3. A method as in claim 1 further comprising:
   calculating a third score of the third metadata; and
   calculating a fourth score of the fourth metadata,
   wherein determining the final meaning comprises comparing the third score to the second score.

4. A method as in claim 3 wherein the first score, the second score, the third score, and the fourth score are in a matrix.

5. A method as in claim 3 wherein:
   the recipient comprises a human language translation application;
   the input is received from the recipient in a first human language; and
   the final meaning is communicated as an annotation in a second human language.

6. A method as in claim 1 wherein:
   the input is received from the recipient;
   the recipient comprises a software application; and
   the final meaning is communicated back to the recipient as a service external to the software application.

7. A method as in claim 1 wherein:
   the input is received from the recipient;
   the recipient comprises a software application; and
   the final meaning is communicated internally to the recipient.

8. A method as in claim 7 implemented as a library called by the software application.

9. A method as in claim 1 wherein the indication is a result of input pre-processing that references the terminology database.

10. A non-transitory computer readable storage medium embodying a computer program for performing a method, said method comprising:
    receiving from a human language translation application, an input comprising,
    a string in a first human language, and
    an indication of an ambiguous term in the string;
    querying a terminology database of a non-transitory computer readable storage medium with the ambiguous term;
    in response to the query, receiving a query result from the terminology database;
    referencing the input to extract from the query result a first sequence comprising,
    first metadata of a first type corresponding to a data of first possible meaning, and
    second metadata of the first type corresponding to a data of a second possible meaning,
    referencing the input to extract from the query result a second sequence comprising,
    third metadata of a second type, and
    fourth metadata of the second type;
    calculating scores for the first, second, third, and fourth metadata;
    comparing the scores in a matrix to determine the data of the first possible meaning to be a final meaning; and
    communicating the final meaning to the human language translation application.

11. A non-transitory computer readable storage medium as in claim 10 wherein the final meaning is in the first human language.

12. A non-transitory computer readable storage medium as in claim 10 wherein the final meaning is in a second human language.

13. A non-transitory computer readable storage medium as in claim 10 wherein the final meaning is communicated as an annotation.

14. A non-transitory computer readable storage medium as in claim 10 wherein the first sequence is a dictionary.

15. A non-transitory computer readable storage medium as in claim 10 wherein the final meaning is communicated as a service external to the human language translation application.

16. A non-transitory computer readable storage medium as in claim 10 wherein the method is implemented internal to the human language translation application.

17. A non-transitory computer readable storage medium as in claim 16 wherein the method is implemented as a library.

18. A non-transitory computer readable storage medium as in claim 10 wherein the indication is a result of input pre-processing that references the terminology database.

19. A non-transitory computer readable storage medium as in claim 18 wherein the input pre-processing involves tokenization.

20. A computer system comprising:
    one or more processors;

a software program, executable on said computer system, the software program configured to cause an in-memory database engine of an in-memory database to:
receive an input comprising,
a string, and
an indication of an ambiguous term in the string;
query a terminology database of a non-transitory computer readable storage medium with the ambiguous term;
in response to the query, receive a query result from the terminology database;
reference the input to extract from the query result, a first sequence comprising,
first metadata of a first type corresponding to a data of first possible meaning,
second metadata of the first type corresponding to a data of a second possible meaning;
reference the input to extract from the query result, a second sequence comprising third metadata of a second type and fourth metadata of the second type;
calculate a first score of the first metadata;
calculate a second score of the second metadata;
compare at least the first score to the second score to determine the data of the first possible meaning to be a final meaning; and
communicate the final meaning to a recipient.

* * * * *